United States Patent [19]
Foeller

[11] Patent Number: 5,287,935
[45] Date of Patent: Feb. 22, 1994

[54] GARDEN WEEDING AND LANDSCAPING TOOL

[76] Inventor: Michael P. Foeller, 2216 Oak Hill Dr., Deland, Fla. 32720

[21] Appl. No.: 987,789

[22] Filed: Dec. 9, 1992

[51] Int. Cl.⁵ .............................................. A01B 1/06
[52] U.S. Cl. .................................. 172/136; 172/358; 172/720; 172/771; 30/314; 56/400.06; 56/400.14
[58] Field of Search ........... 56/400.06, 400.05, 400.14; 172/358, 720, 765, 771, 136; 30/314

[56] References Cited

U.S. PATENT DOCUMENTS

| | | | |
|---|---|---|---|
| D. 230,127 | 1/1974 | Banner | D8/3 |
| D. 262,596 | 1/1982 | Green | D8/11 |
| 417,444 | 12/1889 | Rufe | 30/314 X |
| 572,886 | 12/1896 | Frink | 56/400.14 X |
| 1,437,199 | 11/1922 | Same | 30/314 |
| 1,679,806 | 8/1928 | Bockstadter | 30/314 X |
| 2,010,325 | 8/1935 | Sawyer | 55/10 |
| 2,225,108 | 12/1940 | Glascock | 97/58 |
| 2,591,420 | 4/1952 | Gillespie | 97/59 |
| 2,790,297 | 4/1957 | Gardner | 56/400.14 |
| 4,483,133 | 11/1984 | Pasley | 56/400.06 |
| 4,791,995 | 12/1988 | Hochlan, Jr. | 172/21 |
| 4,821,500 | 4/1989 | MacIvergan | 56/400.14 |
| 4,832,132 | 5/1989 | Barcelon | 172/371 |
| 4,854,391 | 8/1989 | Johnson | 172/354 |
| 4,945,996 | 8/1990 | Codding | 172/233 |
| 5,003,760 | 4/1991 | Webb | 56/400.21 |

FOREIGN PATENT DOCUMENTS 1080537  7/1980  Canada ................................ 172/358

*Primary Examiner*—Randolph A. Reese
*Assistant Examiner*—Christopher J. Novosad
*Attorney, Agent, or Firm*—Edward M. Livingston

[57] ABSTRACT

A manual tool for cutting and removing weeds and grass (11) from gardens and landscaping beds, having a cutting blade (9) and rake (1) attached to the rear and front respectively of a chassis (5) mounted on an axle (4) and wheels (3a, 3b) with a handle (6) angularly attached to the rear of the chassis (5). The cutting blade (9) is preferably concave shaped with a front concave cutting edge (13). When the tool is pushed forward by the handle (6) the concave cutting blade (9) pulls and cuts weeds and grass (11) below the surface of the ground (7). The cut weeds are then removed by pulling backward on the handle (6) which drags tines (2) on the rake (1) over the ground (7) to gather and remove the weeds (11). Optionally, the rake (1) is removeably attachable so that the tool can be used only for cutting weeds (11) as desired.

7 Claims, 2 Drawing Sheets

GARDEN WEEDING AND LANDSCAPING TOOL

BACKGROUND OF THE INVENTION

This invention relates to garden and landscaping tools, more particularly to a weeding tool designed to be used manually.

Normally, weeds or grass, which need to be removed from gardens or flower beds, must be pulled by hand, which is very time consuming and back-breaking work. An alternative to hand removal is to use a cultivator which is pushed through the dirt. However, a cultivator doesn't remove many weeds, but merely churns weeds into the ground. Furthermore, pushing the cultivator through dirt is also back-breaking work. A further alternative to the afore-mentioned approaches includes the use of a machine-powered rotor tiller which churns rather than removes weeds. However, rotor tillers are difficult to use in some gardens and around shrubs and in flower beds due to their size and difficulty in controlling the machine. Moreover, such machines are quite expensive, thus beyond means of many gardeners, and certainly not worthwhile to purchase for small gardens.

In view of the above, there is a need for a relatively inexpensive manual tool which adequately removes weeds and grass in gardens, around flower beds and for other landscaping purposes.

The prior art contains numerous patented tools, but none with the same structure and features as the present invention. Amongst the pertinent prior art tools are the following:

| U.S. Pat. No. | Inventor | Date of Patent |
|---|---|---|
| 2,225,108 | Glascock | Dec. 17, 1940 |
| 2,591,420 | Gillespie | April 1, 1952 |
| DES 262,596 | Green | Jan. 12, 1982 |
| 2,010,325 | Sawyer | Aug. 6, 1935 |
| 2,790,297 | Gardner | April 30, 1957 |
| DES 230,127 | Banner | Jan. 29, 1974 |
| 4,854,391 | Johnson | Aug. 8, 1989 |
| 4,945,996 | Codding | Aug. 7, 1990 |
| 5,003,760 | Webb | April 2, 1991 |
| 4,832,132 | Barcelon | May 23, 1989 |
| 4,791,995 | Hochlan, Jr. | Dec. 20, 1988 |
| 4,821,500 | MacIvergan | April 18, 1989 |
| 4,483,133 | Pasley | Nov. 20, 1984 |

The Glascock patent teaches a combination garden tool having multiple prongs in front and back and supported by a roller, but has no rake or weed cutter. The Gillespie patent teaches a cultivator with prongs having a blade behind it for cutting weeds, but has no rake and the blade is not properly curved for weed cutting. The Green patent illustrates a garden tool with a row digger and coverer. The Sawyer patent shows various rake attachments which convert a rake for use as a hoe or weeder, but it too has a different structure than the present invention. The Gardner patent teaches a guard attachment for a rake designed to limit the depth of penetration of the rake prongs into the ground. The Banner patent teaches a one-wheel weeder with a cutting blade, but no rake. The Johnson patent teaches a multiple use cultivator that has no weeder. The Codding patent shows a rake and soil conditioner with an entirely different structure than the present invention. The Webb patent teaches a combination garden tool for hoeing, raking and cultivating, but has no weed cutter or removal tool. The Barcelon patent teaches a hand weeder with a prong and screw portion that engages the root of the weed for removal. The Hochlan, Jr. patent teaches a manual tool for mulching and weeding having a different structure than the present invention. The MacIvergan patent teaches a manual lake rake that is not close in structure to the present invention. Finally, the Pasley patent shows a tool having raking tines and also a cutting bar in the back for use in weeding, but although it performs the same function as the present invention, it has an entirely different structure and does not have wheels which would make it difficult for use.

In contrast to the above prior patented art, the present invention fulfills the above need and provides various objects and advantages as set forth hereinafter in a different manner which are not provided in any of the afore-referenced patents.

SUMMARY OF THE INVENTION

The primary object of the present invention is to provide a tool that will remove weeds in gardens, flower beds and around shrubs.

Another object of the present invention is to provide such a tool that is easy and convenient to use.

Another object of the present invention is to provide such a tool that can be used manually.

An even further object of the present invention is to provide such a tool that is relatively inexpensive as compared to other machinery which can be used for the same purpose.

The present invention fulfills the above and other objects by providing a garden weeding and landscaping tool that has two wheels attached at opposite ends to an axle with a chassis mounted on the axle perpendicular to the axle. An elongated handle extends angularly upwards and backwards from the chassis for pushing and pulling the invention. On the back of the chassis is mounted a curved weed cutting blade which has a sharp cutting edge on the front side of the blade. The blade is preferably concave shaped toward the front so that it pulls weeds inward toward the center of the blade to create better cutting by rubbing the weed stem against the cutting blade. The weeding tool further contains a rake mounted to the front of the chassis. The rake may be permanently or removeably attachable.

The above and other objects and advantages of the present invention will become even more readily apparent when the preferred embodiments of the invention are described in conjunction with the illustrations contained in the drawing figures.

BRIEF DESCRIPTION OF THE DRAWINGS

The drawings used in conjunction with the description of the preferred embodiments are as follows.

DESCRIPTION OF THE PREFERRED EMBODIMENTS

Figure 1:
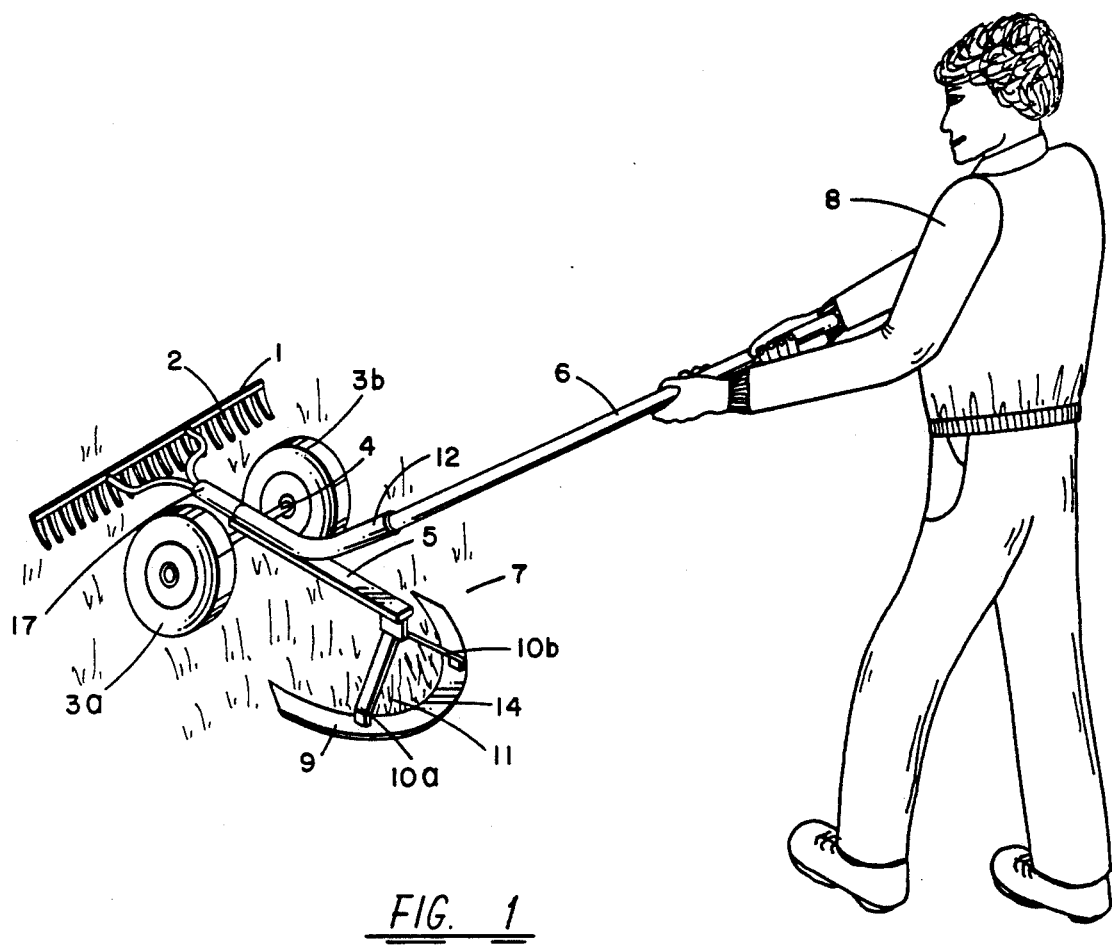
FIG. 1 is a perspective view showing the garden weeding and landscaping tool in use.

Referring now to FIG. 1, a person 8 is shown using the invention by pushing and pulling the tool handle 6. The tool handle 6 is attached to a chassis 5 by a sleeve 12 into which the handle 6 is inserted. A rake attachment 1 with tines 2 is attached to a connector 17 which, like the sleeve 12, is mounted on the chassis 5 preferably by welding. The chassis 5 is secured around an axle 4 to which are mounted wheels 3a and 3b. On the rear of the chassis is mounted a cutting blade 9 by connecting struts 10a and 10b. When a person 8 pushes forward and slightly downward on the handle 6 the blade 9 is dragged forward over the ground 7 so that the blade 9 cuts the weeds or grass 11. Then if the removal of the weeds or grass is desired, the person 8 merely pulls backward and upward on the handle 6 which drags the tines 2 of the rake 1 back over the cut weeds or grass 11, gathering same for removal.

Figure 2:
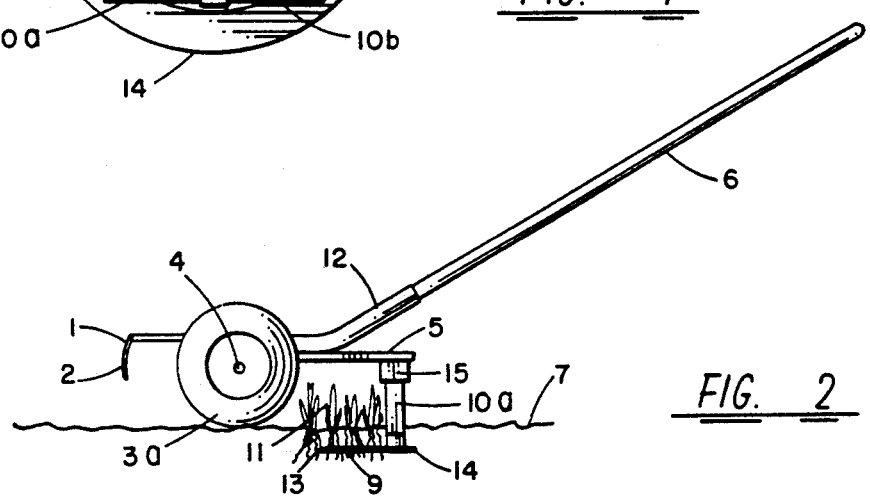
FIG. 2 is a side view of the garden weeding and landscaping tool.

In FIG. 2 the relative position of the cutting blade 9 is illustrated. It is noted that the cutting blade 9 is attached by side support strut 10a and connecting vertical connecting strut 15 to chassis 5 so that it is lower than the tines 2 of the rake 1 relative to the ground 7. In the latter manner, when the handle 6 is pushed forward the blade 9 with its cutting surface 13 is slightly below ground level so that it cuts and removes the weeds 11 below the root or ground surface in order that the weeds are less likely to grow back. Then when one pulls back on the handle 6, due to the angle of the handle 6, the device automatically tips the cutting blade 9 upward out of the ground and pivots the tines 2 of the rake 1 using the axle 4 as a pivot point so that the tines 2 drag along the ground to remove the weeds.

Figure 3:
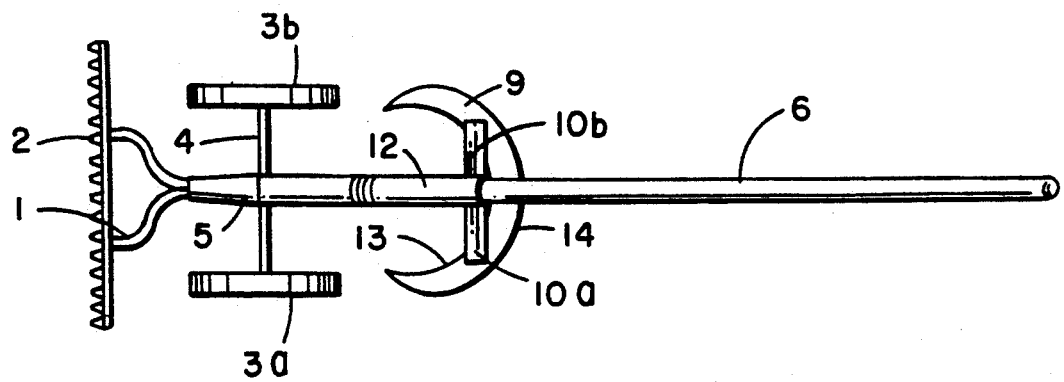
FIG. 3 is a top view of the garden weeding and landscaping tool.

In FIG. 3 the preferable concave-shape of the cutting blade 9 is illustrated. Although the blade 9 could have almost any shape provided the cutting edge 13 faces forward, trial and error has shown that the best shape for the cutting blade 9 is concave. In this manner the weeds which contact the cutting surface 13 are pulled toward the center of the blade as the user pushes forward on the handle 6. The latter action automatically produces a lateral motion against the stem of the weeds thereby cutting the weeds 11 more easily. The other components of FIG. 3 have been previously discussed in relation to the prior drawings.

Figure 4:
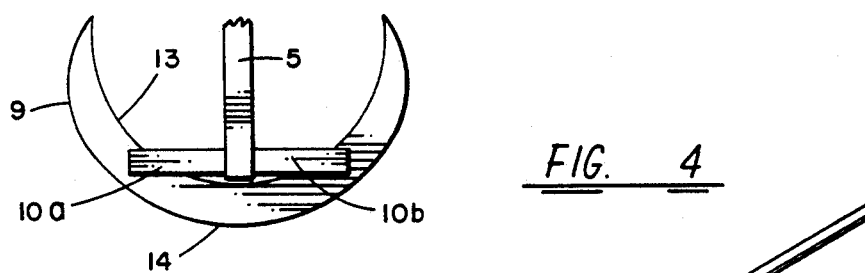
FIG. 4 is a top view of the weed cutting blade and attachment by itself.
Figure 5:
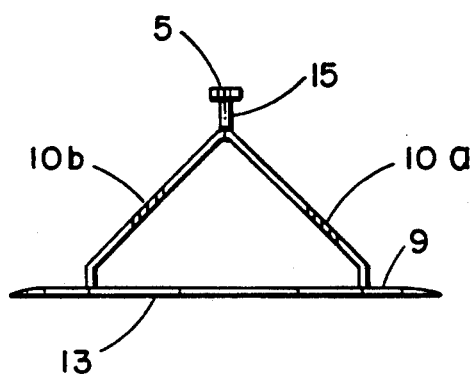
FIG. 5 is a front view of the weed cutting blade shown in FIG. 4.

FIG. 4 shows the cutting blade 9 with its front cutting edge 13 and rear noncutting edge 14 being mounted to "V"-shaped struts 10a and 10b to vertical connecting strut 15 and chassis member 5 as further illustrated in FIG. 5. For strength and simplicity the cutting blade 9 would be attached to the struts 10a and 10b and in turn to connecting strut 15 and chassis 5 by welding.

Figure 6:
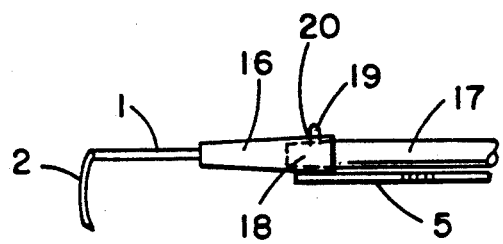
FIG. 6 is a partial side plan view of a removeably attachable rake used on the invention.

The final drawing in FIG. 6 shows the rake 1 with tines 2 in a removeably detachable form. The rake 1 can be made removeably detachable by means of a holding nipple 19 which can be mounted by leaf spring to the rake connecting extension 18 on the rake connector 17 which in turn is mounted preferably by welding to the chassis 5 of the device. In this manner the rake 1 can be easily attached or detached from the device merely by depressing downward on the nipple 19 and sliding the sleeve 16 over the extension 18 until the nipple 19 sets into a hole 20 in the sleeve 16.

Thus, as described herein above, to use the present invention to cut weeds, pushing forward and slightly downward on the handle 6 causes the cutting blade 9 to cut the weeds 11 approximately one inch below the surface of the ground 7. Then, when removing the weeds 11, a slight pull backward and upward on the handle 6 lowers the tines 2 of the rake 1 to the ground 7 to remove the weeds.

The entire tool would primarily be made of metal or metal alloy, particularly the blade 9 and the handle 6 would be preferably wood. However, the tool could be made of almost any rigid material that would accomplish the purpose of this invention.

Although the garden weeding and removal tool of this invention has been described in terms of a few preferred embodiments hereinabove, it should be apparent that modifications and improvements within the scope or spirit of the claims are covered by this invention.

I claim:

1. A garden weeding and landscaping tool comprising:
    two wheels attached to opposite ends of an axle;
    a chassis mounted on said axle perpendicularly to said axle, said chassis having rear and front sides;
    an elongated handle attached to the chassis extended angularly upward along a plane of the chassis toward the rear side of the chassis; and
    a weed-cutting blade mounted horizontally to the rear side of the chassis having a cutting edge at the side of the blade facing the front side of the chassis.

2. The tool of claim 1 wherein the blade is concave-shaped in the direction of the front side of the chassis.

3. The tool of claim 2 further comprising a rake attached to the front side of the chassis, said rake extending in front of the wheels.

4. The tool of claim 3 wherein the rake is removeably detachable from the front side of the chassis as desired.

5. The tool of claim 1 further comprising a rake attached to the front side of the chassis, said rake extending in front of the wheels.

6. The tool of claim 5 wherein the rake is removeably detachable from the front side of the chassis as desired.

7. The tool of claim 5, 3, 6, or 4 wherein the weed-cutting blade is positioned below the rake so that the blade cuts weeds and grass below a ground surface.

* * * * *